United States Patent Office 3,449,191
Patented June 10, 1969

3,449,191
POLYMER BONDING PROCESS AND PRODUCT
Murray E. Taylor, Warren, Mich., assignor to The Boeing Company, Seattle, Wash., a corporation of Delaware
No Drawing. Filed Feb. 3, 1964, Ser. No. 342,232
Int. Cl. C09j *3/12, 7/00;* C09d *3/38*
U.S. Cl. 156—306            12 Claims

ABSTRACT OF THE DISCLOSURE

A polyethylene base material comprises the cured product of a linear polyethylene base and a peroxide selected from the group consisting of 2,5 - bis(tert-butylperoxy-2,5-dimethylhexane and 2,5 - dimethyl - 2,5 - di(t-butylperoxy) hexyne-3. Additional components of fillers and antioxidants are incorporated for selective properties. A method of making an ablative material comprises the steps of fluxing a polyethylene composition, incorporating into the fluxing polyethylene a peroxide of 2,5-bis(tert-butylperoxy)-2,5-dimethylhexane or 2,5 - dimethyl - 2,5 - di(t-butylperoxy)hexyne-3 with or without selected fillers and antioxidants and curing the aggregate at 320+/—40° F. up to an hour in time.

---

This invention relates in general to a process and the resulting materials of this process wherein linear polyethylene and similar organic materials are crosslinked by peroxides with fillers and antioxidants resulting in a homogeneous polyethylene-base ablation material. This invention in particular enables a section of the properties of linear polyethylene-base material and the method of using the linear polyethylene-base material.

Polyethylene and polyethylene derivatives are currently very popular in reference to their quantity and diversity of usage. This popularity of polyethylene and polyethylene derivatives is based on the fact that their fabrication, molding, extrusion and calendering are readily accomplished by standard methods thus enabling these materials to be considered on a competitive basis with any other standard organic material. Normal polyethylenes fall into two categories with respect to density with one category being .91 to .94 and the other category being .94 to .97. Extensive analysis and research efforts have been directed on both density ranges of polyethylene to overcome the material's resistance to cold flow, detrimental solubility and poor high temperature properties including high temperature softening.

These inherent problems of polyethylene have been approached in various manners ranging from irradiation of the polyethylene molecules with ionizing radiation such as gamma rays and high energy electrons to crosslinking the polyethylene with such agents as peroxides, nitrogen compounds and other chemicals capable of liberating free radicals which promote the crosslinking phenomenon. This crosslinking phenomenon with known peroxides has left a disadvantage in that only the lower density polyethylenes, with few of the higher density polyethylenes, have been successfully crosslinked. Since the higher density polyethylenes exhibit excellent ablative properties, the failure to crosslink these higher density polyethylenes has greatly impeded the use of these materials in ablative problems.

Therefore it is an object of this invention to crosslink linear high density polyethylene, as well as low density polyethylene, with or without additives to produce a material with either high melting thermoplastic or thermosetting properties as desired, and suitable, among other things, for ablative purposes.

It is another object of this invention to use a catalyst to crosslink all density ranges of polyethylene, including linear polyethylene, so that during the crosslinking operation the polyethylene is bonded to another material's surface.

It is another object of this invention to use a catalyst to crosslink all density ranges of polyethylene so that during the crosslinking operation the polyethylene is bonded to a dissimilar inorganic material such as a metal surface.

It is another object of this invention to use a catalyst to crosslink linear polyethylene possessing ablative properties so that during the crosslinking operation the polyethylene is bonded to another organic material.

Further objects and applications of this invention as well as its use and operation will be apparent from the following description and claims.

This invention achieves improved properties in polyethylene materials by increasing the melt viscosity, raising the melting point of polyethylene, increasing greatly the effective heat of ablation and enabling selection of the desired heat of ablation of polyethylene material. These improved properties are attained for linear polyethylenes while not sacrificing the currently desirable properties of a linear polyethylene. This invention utilizes the common technique of crosslinking polyethylenes and polyethylene derivatives. Crosslinking consists of the formation of bonds between carbon atoms and ions, radicals or polymeric chains. In crosslinking, the scope of forming a bond between the polyethylene and a second material can run the gamut of having the second material vary from an organic material, including another polyethylene film, all the way to an inorganic material such as a metal sheet.

The crosslinked polyethylene of my invention consists of a peroxide and a member of the polyethylene group, including linear polyethylene, with or without the addition of a carrier for the peroxide. The member of the polyethylene group may have addition of fillers or antioxidants which are designed to supplement or enhance the inherent ablative properties of the resulting product.

The inventive process comprises blending or mixing certain additives and/or fillers into a fluxing linear polyethylene in proportions that may vary from 1 to 100 parts of an additive for each 100 parts of polyethylene with the addition of one or more peroxides. The peroxides vary in the proportions used from 1 to 50 parts of peroxide for each 100 parts of polyethylene. The mixing or blending apparatus for this sequence is the normal manner of using hot rolls, mixers or equivalent mechanisms capable of maintaining temperatures above the melting point of the uncured polyethylene and below the decomposition point of the particular peroxide incorporated in the polyethylene. The normal practice with heating is to attain a temperature above the decomposition point of the peroxide with or without the application of pressure. The application of pressure results in a better material due to a more intimate physical contact. The resulting mixtures are stable and capable of being formed into plates, thin sheets, powder and spray.

The following peroxides have been successfully employed: 2,5-bis(tert-butylperoxy)-2,5-dimethylhexane or 2,5-dimethyl-2,5-di(t-butylperoxy)hexane and 2,5 - dimethyl-2,5-di(t-butylperoxy)hexyne-3. It should be noted that organic peroxides have previously not been thought of as suitable for all linear, high density polyethylene compositions. In the practice of this invention, no difficulty has been encountered with these peroxides being used to crosslink polyethylene compositions.

The following fillers have been successfully incorporated in polyethylene composition in pursuit of ablative properties: aluminum (Al), alumina ($Al_2O_3$), ferric oxide ($Fe_2O_3$), polypropylene, asbestos, cadmium hydroxide ($Cd(OH)_2$), copper (Cu), copper-8-quinolinol, polyester fiber such as Dacron®, silica powder and finely divided carbon. I have also successfully employed an antioxidant in the formulation to prevent subsequent degradation of the formulation. It is currently felt that certain fillers will attain high effective heats of ablation when used in connection with the above process, and the above list is not meant to be exclusive. At this point it is important to recognize the phenomenon of being able to alter the effective heat of ablation of a polyethylene. The use of an antioxidant as terminology is an established practice in the chemical field, and needs no explanation to one familiar in the art.

used with the numbers standing for the peroxides as noted above. The fourth column is the quantity of peroxide used per 100 parts if polyethylene. The softening point in the fifth column means the approximate temperature at which the cured materials of this invention start to lose solid characteristics. The density at room temperature is supplied in the sixth column for the cured materials of this invention. The final two columns have a comparison of the effective heats of ablation of the new crosslinked (cured) material (in the seventh column) with the previous uncured polyethylene material (in the eighth column).

TABLE.—CROSSLINKED MATERIALS [1]

| Filler | Filler, parts 100 parts/ polyethylene | Peroxide | Peroxide, parts/ 100 parts polyethylene | Softening point, °C. | Density, g./cc. | $H_{eff}$ (1) b.t.u./lb. | Percent of $H_{eff}$ of (1) Orig. polyethylene |
|---|---|---|---|---|---|---|---|
| 1 ........ (—) | — | — | — | 135-137 | .953 | 1623 | 100 |
| 2 ........ Asbestos | 10.0 | (2) | 2.0 | [2] 220 | 1.05 | 5422 | 334 |
| 3 ........ Cadmium hydroxide | 2.8 | (2) | 2.0 | [2] 240 | 1.04 | 2186 | 135 |
| 4 ........ Carbon powder | 50.0 | (2) | 4.0 | 200-220 | 1.16 | 3690 | 228 |
| 5 ........ do | 100.0 | (2) | 2.0 | [2] 250 | 1.26 | 4381 | 270 |
| 6 ........ Copper powder | 20.0 | (2) | 2.0 | 200-215 | 1.15 | 1188 | 73 |
| 7 ........ (—) | — | (3) | 5.0 | 220-240 | .941 | 2490 | 152 |
| 8 ........ (—) | — | (3) | 10.0 | [2] 245 | .950 | 2078 | 122 |
| 9 ........ (—) | — | (3) | 30.0 | [2] 250 | 1.08 | 3822 | 235 |
| 10 ....... (—) | — | (2) | 32.0 | [2] 245 | 1.02 | 2711 | 168 |
| 11 ....... Copper-8-quinolinol | 10.0 | (2) | 10.0 | [2] 250 | 1.01 | 2976 | 183 |
| 12 ....... Dacron ® | 20.0 | (3) | 10.0 | 205-215 | .995 | 2573 | 159 |
| 13 ....... Silica powder | 50.0 | (2) | 12.6 | [2] 240 | 1.20 | 6072 | 374 |
| 14 ....... Polypropylene | 100.0 | (3) | 10.0 | 225-245 | .935 | 1901 | 117 |

(1) The effective heat of ablation was determined with a heat flux of 344 B.t.u./ft.$^2$ min. with a torch gas velocity of mach 0.5.
(2) 2,5-bis(tert-butylperoxy)-2,5-dimethylhexane plus 50% inert matter.
(3) 2,5-dimethyl-2,5-di(t-butylperoxy)hexyne-3.
[1] Formulations based on 100 parts of Fortiflex 2001.
[2] Decomposition.

A procedural example of my invention is to start with 100 parts of polyethylene and roll this quantity of polyethylene on a rubber mill which has its rolls heated to 280° F. to 300° F. This rolling is done until the polyethylene has fluxed from the heat of the rolls. Ten parts of a filler from the above list, such as asbestos, and .75 part of an antioxidant were incorporated into the fluxed polyethylene material. Finally 2 parts of peroxide such as 2,5-bis(tert-butylperoxy)-2,5-dimethylhexane are added to the aggregate with an equal amount of another filler, such as silica. The whole composite was mixed on the rolls for three minutes at the above mentioned temperature. After this the material was sheeted from the rolls, formed into the desired shape and further cured by heating. This final curing would follow the typical heating pattern of 320°+/—40° F. for one hour.

The above process can be used for linear polyethylene base materials with variations in the various fillers, peroxides, and antioxidants incorporated in the base structure. The following table gives an idea of the range of compositions of typical thermal protective coatings that can be fabricated from modified polyethylenes. In addition, the table illustrates the marked alteration in the ablative properties of polyethylene as a result of the process entailed in this invention. The following table compares effective heats of ablation of the modified polyethylene with the effective heats of ablation of the original unaltered polyethylene thus showing that the instant invention does change the effective heat of ablation of the polyethylenes. All of the formulations in the following table have originated from formulations based on 100 parts of polyethylene.

In the table peroxide number 2 represents 2,5-bis(tert-butylperoxy)-2,5-dimethylhexane (with 50% inert mineral matter) or 2,5-dimethyl-2,5-di(t-butylperoxy)hexane (with 50% inert mineral matter). Peroxide number 3 represents 2,5-dimethyl-2,5-di(t-butylperoxy)hexyne-3. The first column in the table represents the filler material used in the particular formulations with a dash in the space meaning that no filler was used. The second column designates the quantity of filler used while the third column designates by number the particular peroxide New structures or modifications of existing compounds often defy identification by normal, conventional techniques. Attempts to identify the changes in the polyethylene structure and the resulting identity of the materials of this invention have met with frustration. These attempts have included all the conventional techniques of chemical analysis. Therefore the above table of the properties of each material in this invention represents the best manner of classification currently available.

The above process can be conducted in proximity with another material's surface so as to deposit the crosslinked polyethylene on the surface of the other material in a firm bond. This is done without adverse chemical reactions with the surface of the other material used for bonding. The bond formed is of high quality with the result that a stable structure is formed consisting of the polyethylene layer adhering to a second material.

In the past, polyethylene could not be attached to the surface of different materials or to another surface of polyethylene without the aid of bonding agents, such as adhesives. This is because a polyethylene surface acts as its own parting agent, thus making bonding difficult. Naturally the present advance in the art makes possible the use of polyethylene as an intermediate layer to bond two layers of materials which would not otherwise be compatibly bonded.

The type of bond formed between polyethylene and the foreign surface is not a mere mechanical bond but is a quality chemical bond imparting strength to the resulting structure. Further support for the theory that a permanent bond is formed results from the fact that it is difficult, if not impossible, to cleanly part the polyethylene from the foreign material. This can only lead to the conclusion that the carbon chains chemically bond themselves with the foreign material. Naturally the bond formed depends on the foreign material used.

Examples of the range of materials which I can bond to polyethylene include polytetrafluoroethylene, aluminum and copper plus related metals and related organic materials. Hence the organic polyethylenes can be bonded to another similar organic material or to a dissimilar inorganic metal. In addition, I have been able to take a modified polyethylene material and join it to another organic or inorganic material. Examples of each are the following: bonding polytetrafluoroethylene to polyethylene and bonding polytetrafluoroethylene to aluminum or copper.

The process for adhering a polyethylene-type material to another material as set forth in the above paragraph starts with blending or mixing certain peroxides into the fluxing polyethylene (at 280° F. to 300° F.) in proportions that may vary from 5 to 50% peroxide with or without filling materials. This blending or mixing is done on hot rolls, heated mixers or other heat mixing apparatus at temperatures above the melting or fluxing point of polyethylene and below the decomposition point of the peroxide additive. When the mixtures are cooled to room temperatures they are stable and may be applied in the form of plates, thin sheets or powder to other objects that are subsequently heated above the decomposition point of the peroxide with or without the application of pressure. The bond formed between a metal and the polyethylene shows a very satisfactory ultimate bond stress of 2000 p.s.i. to 2450 p.s.i. at room temperature. Successful bonds have been achieved using all the various fillers and peroxides given previously. Naturally, it should be noted that the temperatures of the process vary with the specific components employed. At this time the type of the bond and the structure of the bond are not known.

A typical detailed example of my invention is the practice of bonding polytetrafluoroethylene to a foreign surface of a body such as a metallic body. The polytetrafluoroethylene surface is etched by a sodium-liquid ammonia solution or similar reactant. The polytetrafluoroethylene surface was then brought in contact with an organic peroxide through one of the following methods: putting an organic peroxide in powder form on the polytetrafluoroethylene, pouring the organic peroxide as a liquid or solution on the polytetrafluoroethylene. After contacting the polytetrafluoroethylene with the peroxide, the metal sheet is placed next to the surface of the polytetrafluoroethylene which has been treated with the peroxide. The assembly is then subjected to an elevated temperature and the application of pressure. In normal practice a temperature of 320° F.+/−40° F. is used. A typical pressure application is 20 to 30 pounds per square inch. The temperature and pressure step is usually complete in less than an hour. The temperature and pressure step of the process completes the process of forming a bond between a polyethylene-base material and another material.

While I have described and illustrated some preferred forms of my invention, it should be understood that many modifications may be made without departing from the spirit and scope of the invention, and it should therefore be understood that this invention is limited only by the scope of the appended claims.

I claim:

1. An article of manufacture having ablative properties and comprising a substrate selected from the group consisting of metals, olefin polymers, and halogenated olefin polymers; and an ablative coating superimposed on said substrate and adherently bonded thereon to form a surface zone, said coating comprising the cured, crosslinked product of:
   (a) a polymer selected from the group consisting of linear polyethylene and polytetrafluoroethylene;
   (b) from one to fifty parts per 100 parts of the polymer of a peroxide selected from the group consisting of 2,5-bis(tert-butylperoxy)-2,5-dimethylhexane and 2,5-dimethyl-2,5-di(5-butylperoxy)hexyne-3; and
   (c) one to one hundred parts of filler material per one hundred parts of polymer.

2. The article of claim 1 in which said polymer is linear polyethylene.

3. The article of claim 2 in which said filler material is selected from the group consisting of asbestos, cadmium hydroxide, carbon, finely divided silica powder, copper-8-quinolinol, alumina, aluminum, ferric oxide, polypropylene, and polyester fiber.

4. A process for bonding a polymer to surface of a foreign member, said surface being constructed of a material selected from the group consisting of metals, olefin polymers, and halogenated olefin polymers, and said process comprising contacting a polymer selected from the group consisting of polyethylene and polytetrafluoroethylene, with a peroxide selected from the group consisting of 2,5-bis(tert-butylperoxy)-2,5-dimethylhexane and 2,5-dimethyl - 2,5-di(5-butylperoxy)hexyne-3, contacting the peroxide-treated polymer with the surface of the foreign member, and curing the composite with heat.

5. The process of claim 4 wherein the peroxide is admixed with the polymer before the polymer is contacted with the surface of the foreign member.

6. The process of claim 4 wherein the peroxide is applied to a surface made of the polymer, the surface of the foreign member is contacted with the peroxide-treated polymer surface and the composite is cured with heat.

7. The process of claim 4 wherein the polymer is linear polyethylene.

8. The process of claim 4 wherein the polymer is polytetrafluoroethylene.

9. The process of claim 4 wherein the surface of the foreign member is constructed of a material selected from the group consisting of aluminum, copper, polyethylene, and polytetrafluoroethylene.

10. The process of claim 4 wherein the surface of the foreign member and the peroxide-treated polymer are contacted under a positively applied pressure.

11. A process for bonding polyethylene to a surface of a foreign member, the surface being constructed of a material selected from the group consisting of metals, olefin polymers, and halogenated olefin polymers, said process comprising the steps of:
   (1) admixing linear polyethylene with from 1 to 50 parts of an organic peroxide per 100 parts of polyethylene, said peroxide being selected from the group consisting of 2,5-bis(tert-butylperoxy)-2,5-dimethylhexane and 2,5-dimethyl-2,5-di(tert-butylperoxy)hexyne-3,
   (2) forming a sheet from the admixed polyethylene-peroxide mixture, and
   (3) placing a surface of the sheet in physical contact with the surface of the foreign member and curing the composite by heating.

12. The process of claim 11 wherein the surface of the foreign member is aluminum.

References Cited
UNITED STATES PATENTS

| | | | |
|---|---|---|---|
| 3,135,805 | 6/1964 | Gilmont | 260—41 |
| 2,938,012 | 5/1960 | Filar | 260—41 |
| 3,086,966 | 4/1963 | Mageli et al. | 260—94.9 |
| 3,202,648 | 8/1965 | Latourette et al. | 260—41 |
| 3,234,197 | 2/1966 | Baum | 161—216 |
| 3,214,422 | 10/1965 | Mageli et al. | 260—93.7 |

OTHER REFERENCES

Materials in Design Engineering, December 1961, page 97.

Gaylord et al.: "Linear and Stereoregular Addition Polymers," Interscience Publishers, Inc., New York, 1959, pages 49 and 50.

ALLAN LIEBERMAN, *Primary Examiner.*

U.S. Cl. X.R.

117—132, 138.8, 161; 161—189, 216, 252; 260—46, 92.1, 94.9